United States Patent
Collins et al.

(10) Patent No.: US 11,633,961 B2
(45) Date of Patent: Apr. 25, 2023

(54) PRINTING METHODS AND SYSTEMS

(71) Applicant: Global Inkjet Systems Limited, Cambridge (GB)

(72) Inventors: Philip Collins, Cambridge (GB); Nicholas Campbell Geddes, Suffolk (GB)

(73) Assignee: Global Inkjet Systems Limited, Cambridge (GB)

( * ) Notice: Subject to any disclaimer, the term of this patent is extended or adjusted under 35 U.S.C. 154(b) by 175 days.

(21) Appl. No.: 17/320,761

(22) Filed: May 14, 2021

(65) Prior Publication Data

US 2021/0339523 A1    Nov. 4, 2021

Related U.S. Application Data

(63) Continuation of application No. PCT/GB2019/052588, filed on Sep. 16, 2019.

(30) Foreign Application Priority Data

Nov. 22, 2018 (GB) ..................... 1819047

(51) Int. Cl.
*B41J 2/045* (2006.01)
*B41J 3/407* (2006.01)

(52) U.S. Cl.
CPC ......... *B41J 3/4073* (2013.01); *B41J 2/04505* (2013.01); *B41J 2/04586* (2013.01)

(58) Field of Classification Search
CPC ... B41J 3/4073; B41J 2/04505; B41J 2/04586
See application file for complete search history.

(56) References Cited

U.S. PATENT DOCUMENTS

| 7,891,757 B2 * | 2/2011 | Fellingham | B41J 2/2135 |
| | | | 347/19 |
| 8,842,331 B1 | 9/2014 | Enge | |
| 9,527,275 B1 | 12/2016 | Flannigan et al. | |

FOREIGN PATENT DOCUMENTS

| WO | WO 2004/007203 A1 | 1/2004 |
| WO | WO 2020/104763 A1 | 5/2020 |

OTHER PUBLICATIONS

International Search Report, International Preliminary Report on Patentability and Written Opinion for Application No. PCT/GB2019/052588 dated Nov. 20, 2019.
Chinese Office Action for Application No. 201980058327 dated Jul. 12, 2022.

* cited by examiner

*Primary Examiner* — Thinh H Nguyen
(74) *Attorney, Agent, or Firm* — KDW Firm PLLC

(57) ABSTRACT

A method of controlling a system including a printhead for printing an image on at least one surface, wherein the at least one surface differs in shape from a nominal surface by a known tolerance, and wherein the printhead and the at least one surface move relative to each other along a predetermined print path comprising at least one swathe. Small dot patterns (referred to as "pathfinders") are printed on a surface of the object in a preliminary printing pass, then the printed dot patterns are analyzed, for example with a machine vision system. The necessary corrections may then be calculated from this analysis and applied to a subsequent full printing pass.

16 Claims, 4 Drawing Sheets

PRINTING METHODS AND SYSTEMS

CROSS-REFERENCE TO RELATED APPLICATIONS

This application is a continuation of and claims priority to PCT/GB2019/052588 filed Sep. 16, 2019, which claims the benefit of and priority to GB Application No. 1819047.0 filed Nov. 22, 2018, the entire disclosures of which are incorporated by reference herein.

TECHNICAL FIELD

Aspects of the disclosure herein generally relate to inkjet printing systems and, in particular, to methods and systems for inkjet printing systems which correct for inherent positioning errors.

BACKGROUND

Modern inkjet printing systems typically include printheads containing multiple droplet ejection devices, also referred to as "nozzles" which form nozzle arrays. Each nozzle typically comprises an actuator that is arranged to eject ink from the nozzle when actuated. Such actuators include piezoelectric actuators for example.

Actuators are driven by drive electronics (electronic drive circuits) which provide a voltage waveform or common drive signal which is configured to result in the ejection of ink from a nozzle. For example, an actuation event creates a pressure pulse in an ink chamber of the nozzle, which in turn dispenses a drop of ink.

In many applications the drive electronics supply a common drive signal to many nozzles, and a separate or integrated controller provides data switching to the printhead that determines which of the individual nozzles are to jet ink for a given instance of the actuation event. Data for a group of nozzles associated with a shared actuation event is called "stripe data".

By arranging a coordinated sequence of drive signals and switching inputs, the printhead produces an image on a substrate in the form of a pixel array as the printhead and substrate (an object surface) move relative to one another. This is applicable to, but not restricted to, single-pass printing systems, and scanning printing systems. Data for such a coordinated sequence of actuation events being one or more instances of "stripe data" is called "swathe data". An area addressed by each printhead during printing is typically known as a "swathe".

Printing resolution refers to the number of dots printed in a unit distance and the pitch is its reciprocal. For example, printed dots placed at a pitch of 254 µm could be described as having a resolution of 100 dots per inch (2.54 cm). Process-direction resolution is the printed dot spacing along the relative path between the nozzle array and surface. Cross-process resolution is the printed dot spacing perpendicular to this. Unless otherwise specified, "resolution" indicates process-direction resolution.

Many inkjet printing systems present inherent positioning errors which are too large to allow for accurate printing without correction. These errors may for example be due to inaccuracies in the print process (for example fine errors in robotic positioning systems and/or jetting variations caused by changes in printhead orientation) which are substantially repeatable but which would be difficult or expensive to correct by system calibration, and/or variations in the dimensions of manufactured objects.

It is to these problems, amongst others, that aspects according to the disclosure herein attempt to offer a solution.

SUMMARY

According to a first independent aspect of the disclosure herein, there is provided a method of controlling a system comprising a printhead for printing an image on at least one surface, wherein the at least one surface differs in shape from a nominal surface by a known tolerance, and wherein the printhead and the at least one surface move relative to each other along a predetermined print path comprising at least one swathe, the method comprising the steps of:

providing first swathe data for printing the image on the nominal surface;

providing second swathe data for the at least one swathe, wherein the second swathe data defines a sequence of marks made by the printhead, which produces a sequence of predetermined dot patterns when printed on the nominal surface, wherein at least one pair of dot patterns from the sequence of dot patterns has a nominal geometric relationship;

printing the second swathe data on the at least one surface;

determining, for at least one of the at least one pair of dot patterns, the actual geometric relationship of the at least one pair of dot patterns printed on the at least one surface;

comparing the actual geometric relationship with the nominal geometric relationship to determine at least one difference; and providing third swathe data by applying an adjustment to the first swathe data to compensate for the at least one difference.

Aspects of the disclosure herein are advantageous for correcting print position errors of whatever cause particularly when printing on objects (shapes) which have a curved surface and differ from a nominal shape due to manufacturing variations. Small predetermined dot patterns (referred to as "pathfinders") are printed on a surface of the object in a preliminary printing pass, then the printed dot patterns are analyzed, for example with a machine vision system. The necessary corrections may then be calculated from this analysis and applied to a subsequent full printing pass.

The "nominal geometric relationship" in this aspect refers to the physical structure of dot patterns in the sequence. For example, a sequence of dots may be printed at a known interval so that there is a nominal dot pitch between neighbouring dots.

In a dependent aspect, the method further comprises the step of printing the third swathe data on the at least one surface.

In a dependent aspect, the sequence of predetermined dot patterns is provided along the predetermined print path. This enables compensation for errors which cause variations of dot placement in the process direction.

In a dependent aspect, the sequence of predetermined dot patterns comprises a sub-sequence of dot patterns provided at a known orientation relative to the predetermined print path. The knowledge of the orientation makes it possible to identify the dot patterns and to measure the variation in the geometric relationship between them.

In a dependent aspect, the predetermined print path comprises at least two swathes, wherein a first dot pattern in the pair corresponds to a first swathe from the at least two swathes and wherein the other dot pattern in the pair corresponds to a second swathe from the at least two swathes. This enables alignment of swathes for example by applying a correction corresponding to the variation in the geometric relationship between the first and the other dot patterns in the pair.

In a dependent aspect, the printhead is configured to print with a plurality of different inks. In another dependent aspect, the printhead is configured to print with a first ink, the system comprising a further printhead configured to print with a second ink. The first ink may be different from the second ink for example having different colors. It is advantageous to achieve accurate registration between the different colors.

In a dependent aspect, the sequence of predetermined dot patterns is chosen to have varying intervals and positions to reduce structure which may be detected visually by humans. It is advantageous to make the "pathfinder" dots less noticeable.

In a dependent aspect, at least one predetermined dot pattern in the sequence of predetermined dot patterns is positioned in a region of the at least one surface which will be printed on when the third swathe data is printed. Advantageously, the "pathfinder" dot patterns may thus be concealed by arranging for as many dot patterns as possible to be in positions where they will be covered by the corrected image being printed and few or none in areas where the image is blank. It will be understood that the region of the at least one surface has a corresponding region in the nominal surface, within a maximum tolerance; the region on the nominal surface is preferably carefully chosen so that the concealing is achieved by the corresponding region of the at least one surface, when printed.

In a dependent aspect, at least one predetermined dot pattern in the sequence of predetermined dot patterns is positioned in a region of the at least one surface which will be printed on with the same or similar ink when the third swathe data is printed, wherein the third swathe data is modified to compensate for the existence of the at least one predetermined dot pattern by not printing dots where their actual geometric relationship has been measured. Advantageously, the "pathfinder" dot patterns may thus be concealed by arranging for as many dot patterns as possible to be in positions where they will be otherwise printed by the corrected image being printed and few or none in areas where the image is blank.

In a dependent aspect, at least one predetermined dot pattern in the sequence of predetermined dot patterns is positioned in a region of the nominal surface which will not be printed on when the third swathe data is printed, wherein the third swathe data is configured to print over the at least one predetermined dot pattern with an ink chosen to conceal the at least one predetermined dot pattern by being similar to the color of the at least one surface which is unprinted. Advantageously, the "pathfinder" dot patterns may thus be concealed in areas where the image is blank.

In a dependent aspect, the second swathe data is printed on the at least one surface using an ink which does not leave a permanent visible mark on the at least one surface. For example, this may be a volatile ink which may be measured before it evaporates, or an ink which is clear in the visible spectrum, but which may be visible under alternative illumination (e.g. infrared or ultraviolet light).

In a dependent aspect, the step of determining the actual geometric relationship comprises using a digital camera and an image processing module, wherein the image processing module is configured to analyze the relative positions of the printed dots in the printed second swathe data, and to identify groups of dots which comprise the at least one dot pattern. In a further dependent aspect, the image processing module is configured to compare the actual geometric relationship with the nominal geometric relationship to determine the at least one difference.

According to a second independent aspect of the disclosure herein, there is provided a method of controlling a system comprising a printhead for printing an image on at least one surface, wherein the at least one surface differs in shape from a nominal surface by a known tolerance, and wherein the printhead and the at least one surface move relative to each other along a predetermined print path comprising at least one swathe, the method comprising the steps of:

providing first swathe data for printing the image on the nominal surface;

providing second swathe data for the at least one swathe, wherein the second swathe data defines a sequence of marks made by the printhead, which produces a sequence of predetermined dot patterns when printed on the nominal surface, wherein at least one dot pattern from the sequence of dot patterns and a feature of the nominal surface have a nominal geometric relationship;

printing the second swathe data on the at least one surface;

determining, for at least one of the least one dot pattern, the actual geometric relationship of the at least one dot pattern printed on the at least one surface and a feature of the at least one surface corresponding to the feature of the nominal surface;

comparing the actual geometric relationship with the nominal geometric relationship to determine at least one difference; and providing third swathe data by applying an adjustment to the first swathe data to compensate for the at least one difference.

The "nominal geometric relationship" in this aspect refers to an expected relationship (distance and/or positioning) between the dot patterns in the sequence and a feature of the at least one surface. For example, the feature may be a straight edge or a round hole, or other known shape and a corresponding regular shape in the image might be preserved by correcting for errors relative to the feature. It will be understood that there may be a plurality of such features on the at least one surface.

According to a third independent aspect of the disclosure herein, there is provided a system comprising a printhead configured to print an image on at least one surface, wherein the at least one surface differs in shape from a nominal surface by a known tolerance, and wherein the printhead and the at least one surface move relative to each other along a predetermined print path comprising at least one swathe, the system further comprising a processor configured to:

provide first swathe data for printing the image on the nominal surface; and provide second swathe data for the at least one swathe, wherein the second swathe data defines a sequence of marks to be made by the printhead, which produce a sequence of predetermined dot patterns when printed on the nominal surface, wherein at least one pair of dot patterns from the sequence of dot patterns has a nominal geometric relationship;

wherein the printhead is further configured to print the second swathe data on the at least one surface;

wherein the processor is further configured to:

determine, for at least one of the at least one pair of dot patterns, the actual geometric relationship of the at least one pair of dot patterns when printed on the at least one surface;

compare the actual geometric relationship with the nominal geometric relationship to determine at least one difference; and provide third swathe data by applying an adjustment to the first swathe data to compensate for the at least one difference.

According to a fourth independent aspect of the disclosure herein, there is provided a system comprising a printhead configured to print an image on at least one surface, wherein the at least one surface differs in shape from a nominal surface by a known tolerance, and wherein the printhead and the at least one surface move relative to each other along a predetermined print path comprising at least one swathe, the system further comprising a processor configured to:

provide first swathe data for printing the image on the nominal surface; and provide second swathe data for the at least one swathe, wherein the second swathe data defines a sequence of marks to be made by the printhead, which produce a sequence of predetermined dot patterns when printed on the nominal surface, wherein at least one dot pattern from the sequence of dot patterns and a feature of the nominal surface have a nominal geometric relationship;

wherein the printhead is further configured to print the second swathe data on the at least one surface;

wherein the processor is further configured to:

determine, for at least one of the least one dot pattern, the actual geometric relationship of the at least one dot pattern printed on the at least one surface and a feature of the at least one surface corresponding to the feature of the nominal surface;

compare the actual geometric relationship with the nominal geometric relationship to determine at least one difference; and provide third swathe data by applying an adjustment to the first swathe data to compensate for the at least one difference.

In a dependent aspect, the system further comprises a digital camera and an image processing module configured to determine the actual geometric relationship.

In a dependent aspect, there is provided a printing system comprising a system according to the third or fourth independent aspects.

BRIEF DESCRIPTION OF THE DRAWINGS

Aspects of the disclosure herein will now be described, by way of example only, with reference to the accompanying figures, in which.

DETAILED DESCRIPTION

Figure 1:
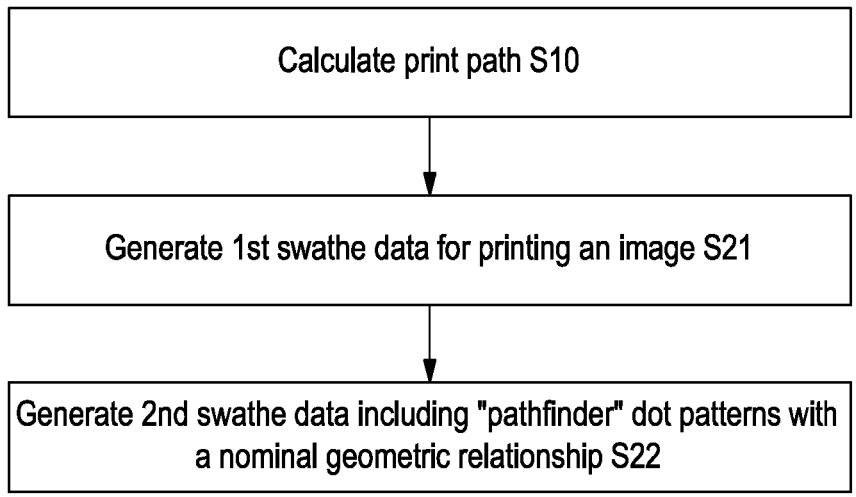
FIG. 1 is a schematic illustration of preparatory method steps carried out (once, in a preliminary pass) before a shape is printed.
Figure 2:
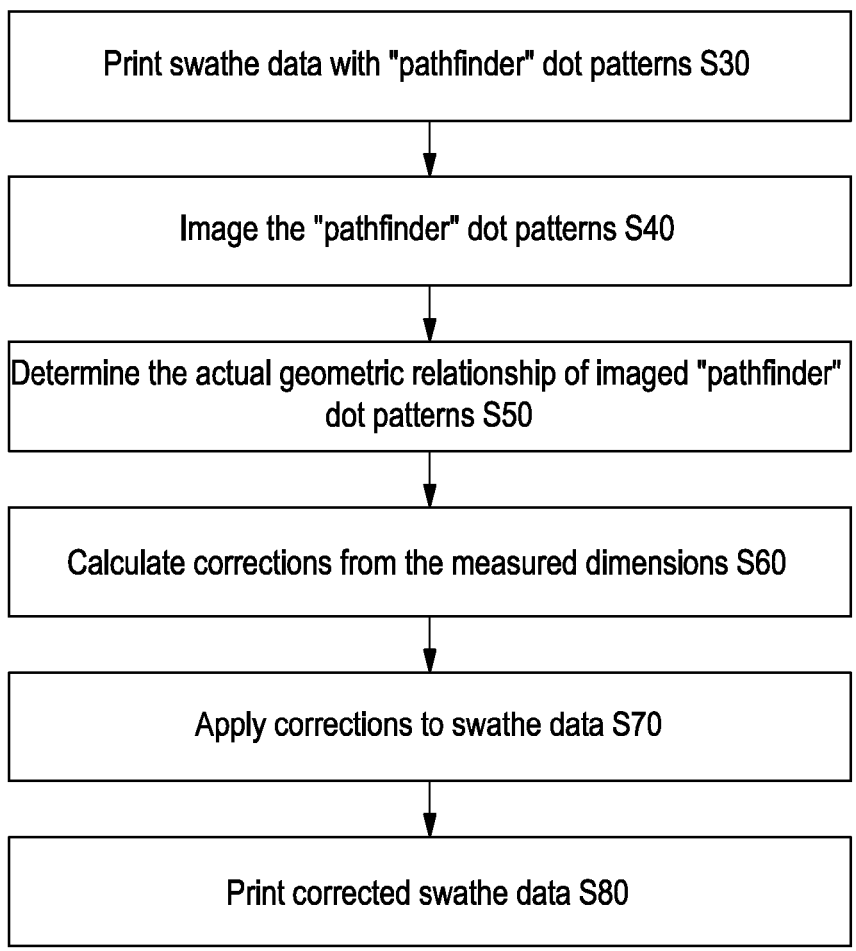
FIG. 2 is a schematic illustration of method steps following the preparatory steps (repeatable for each object)

An example printing system is provided to coat or decorate surfaces of a series objects, each one of the objects having the same nominal shape (nominal object surface) but being subject to tolerances in the order of a few hundred microns. FIG. 1 shows preparatory steps which are carried out once before the first object is printed. FIG. 2 shows method steps to be repeated for each object, once the preparatory steps are completed.

At step S10, a "print path" is calculated for the nominal object surface. A "print path" describes the relative movement of the printhead relative to a surface for printing. The print path describes the plurality of locations on the surface which are to pass under a nozzle. Determining the path of an individual nozzle provides the locus the nozzle traces across the target surface. This relative motion is equivalent even if the arrangement of nozzles is static and the object moves, or both move providing a relative motion.

When determining the print path, sufficient printhead clearance must be allowed to avoid printhead crashes for any object within tolerance.

At step S21, first swathe data is generated for printing an image on the nominal object surface. At step S22, second swathe data is generated which includes "pathfinder" dot patterns. Pathfinder patterns are groups of individual dots (dot patterns). It will be appreciated that steps S21 and S22 may be also be carried out in reverse order.

It is important to design the dot patterns so that measurements can be made by observing the relative positions of a small group of dots, thus removing the need to achieve absolute accuracy of positioning.

Pathfinder dot patterns may be of the following types:
1. "Swathe alignment patterns", representing dot patterns which should be in a known alignment with similar patterns in neighbouring swathes.
2. "Swathe progress patterns", representing dot patterns which record the relative movement of the printheads along the swathe.
3. "Feature alignment patterns", representing dot patterns which should be in a known alignment with features of the nominal surface.
4. "Color registration patterns", representing dot patterns of different color inks which should be accurately registered.

Accordingly, the pathfinder dot patterns may have a known geometric relationship between each other (forming pairs of pathfinder dot patterns) or they may be in a known geometric relationship with a feature on the nominal object surface. It will be appreciated that the above is not an exclusive list of types of pathfinder dot patterns.

Figure 3:
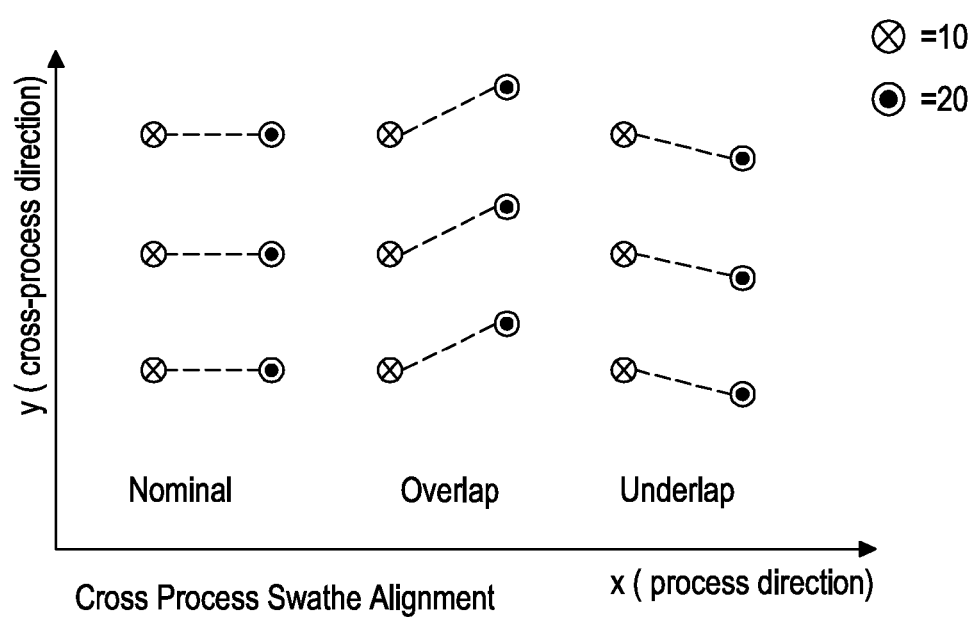
FIG. 3 is a schematic illustration of swathe alignment patterns.

FIG. 3 shows three examples of the first type of pathfinder dot patterns listed above. Swathe alignment patterns 10,20 have been printed at a horizontal swathe boundary in a region where two swathes overlap in the cross-processing direction. The left-hand side dots 10 are printed as part of the upper swathe and the right-hand side dots 20 are printed as part of the lower swathe.

If the positioning error is zero, then the relative positions of the dots in the cross-process direction will be nominal. If the right-hand side dots 20 are higher than the left-hand side dots 10, then there is an overlap. If the right-hand side dots 20 are lower than the left-hand side dots 10, then there is a gap or underlap. It will be understood that, in practice, the dot patterns will be separated sufficiently that an image processing module can locate them unambiguously and extract the overlap measurement.

Figure 4:
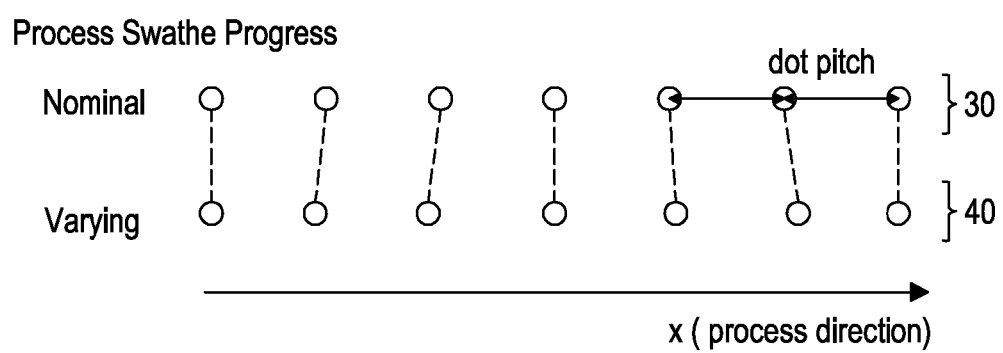
FIG. 4 is a schematic illustration of swathe progress patterns.

FIG. 4 shows two examples of the second type of pathfinder dot patterns. In both patterns, the dots have been printed at regular intervals. By "interval" we mean a time interval or an interval between encoder pulses for example. In the example of FIG. 4, the sequence of printed dots comprises dots 30 that are evenly spaced (by a nominal dot pitch). In the example of FIG. 4, the distance between two adjacent dots 40 varies.

The variation in the dot placement may be due to the combination of print path and surface dimensional errors. For example, where a printhead is controlled by a robot arm, there are likely to be the errors in robot positioning. The absolute value of these errors can be several hundred microns for static poses, possibly more for dynamic paths. However, the repeat accuracy is usually very good—typically as good as 20-30 microns. Other likely source of errors are variations expected in the dimensions of manufactured objects (e.g. due to injection moulding tolerances).

Once the preparatory method steps are complete, the following steps are repeated for each object (FIG. 2):

At step S30, the second swathe data with pathfinder dot patterns is printed on the surface of the object. The second swathe data may include one or more types of "pathfinder" patterns described above.

At step S40, the printed dot patterns are imaged by known image capturing approaches, such as a camera or a machine vision system. The captured images should have a resolution at least equivalent to the required print accuracy, preferably with an accuracy better than twice the dot pitch.

At step S50, the actual geometric relationships, for example the relevant dimensions, are measured for imaged pathfinder dot groups. For example, an image processing module may be used to analyze the relative positions of printed dots in the printed second swathe data, and to identify groups of dots which comprise the at least one dot pattern. The measurements should allow for camera viewpoint and lens geometry for example.

Figure 5:
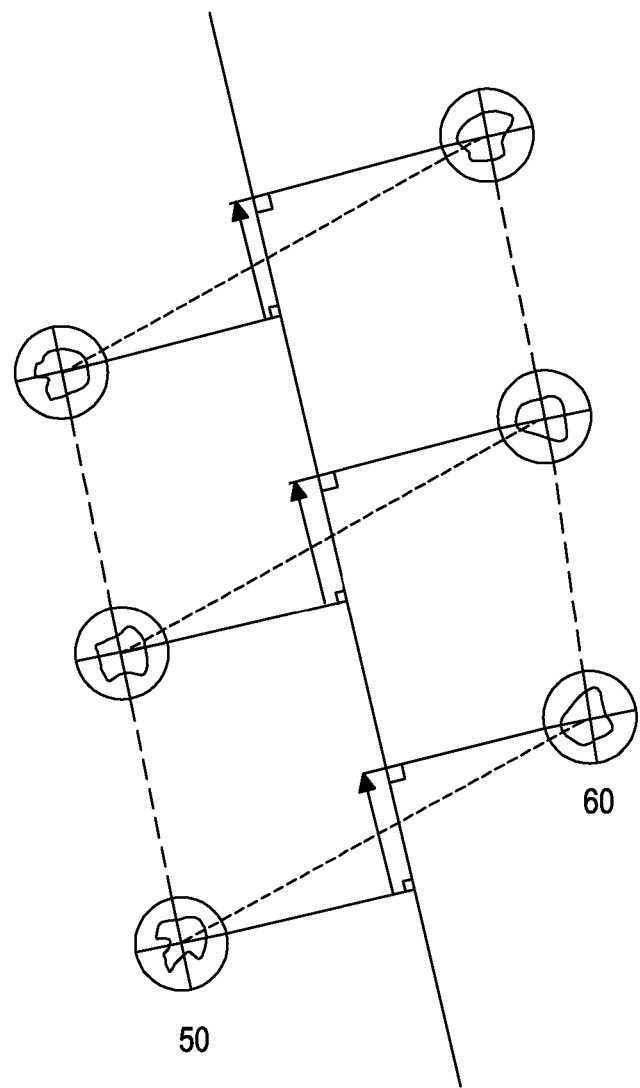
FIG. 5 is a schematic illustration of imaged groups of printed swathe alignment patterns and measurements of their actual geometric relationship.

FIG. 5 shows an example of an imaged group of dot patterns and a schematic analysis of the actual geometric relationship between two dot patterns 50, 60 (of triplets on the left-hand side and right-hand side respectively) identified by the imaging processing module. In this example, one of the patterns 50 was printed by a first swathe and the other pattern 60 by a second swathe.

At step S60, the actual geometric relationship is compared to the nominal geometric relationship (e.g. of the type shown in FIG. 3). As can be seen from FIG. 5, the actual geometric relationship indicates that there is an overlap between the two swathes (of the type shown in FIG. 3). Accordingly, using the measurements and image analysis at step S50 it is possible to calculate corrections (distortions) required to compensate for print errors, for example swathe misalignment and/or printhead speed variations.

At step S70, the corrections are applied to the first swathe data (the image to be printed) to produce the third swathe data. At step S80, the third swathe data (corrected image) is printed onto the surface of the object.

It will be appreciated by the person skilled in the art that by "printhead" we understand any form of mark making device, for example an inkjet printhead, a laser etching device, a mechanical scribe or punch. Accordingly, an "image" in the context of the disclosure herein describes any arrangement of marks to be made on the surface of an object. This may include, but not limited to, graphics, text, a functional material, a coating or pre-treatment, etching or resistant chemical, adhesive or biological material.

Those skilled in the art will be able to make modifications and alternatives in view of the disclosure which are contemplated as falling within the scope of the appended claims. Each feature disclosed or illustrated in the present specification may be incorporated in the disclosure herein, whether alone or in any appropriate combination with any other feature disclosed or illustrated herein.

The invention claimed is:

1. A method of controlling a system comprising a printhead for printing an image on at least one surface, wherein the at least one surface differs in shape from a nominal surface by a known tolerance, and wherein the printhead and the at least one surface move relative to each other along a predetermined print path comprising at least one swathe of image data, the method comprising:
   providing first swathe data for printing the image on the nominal surface;
   providing second swathe data for the at least one swathe, wherein the second swathe data defines a sequence of marks made by the printhead, which produces a sequence of predetermined dot patterns when printed on the nominal surface, wherein at least one dot pattern from the sequence of dot patterns and an existing feature of the nominal surface have a nominal geometric relationship;
   printing the second swathe data on the at least one surface;
   determining, for at least one of the least one dot pattern, an actual geometric relationship of the at least one dot pattern printed on the at least one surface and an existing feature of the at least one surface corresponding to the existing feature of the nominal surface;
   comparing the actual geometric relationship with the nominal geometric relationship to determine at least one difference; and
   providing third swathe data by applying an adjustment to the first swathe data to compensate for the at least one difference.

2. The method according to claim 1, further comprising printing the third swathe data on the at least one surface.

3. The method according to claim 1, wherein the sequence of predetermined dot patterns is provided along the predetermined print path.

4. The method according to claim 1, wherein the sequence of predetermined dot patterns comprises a sub-sequence of dot patterns provided at a known orientation relative to the predetermined print path.

5. The method according to claim 1, wherein the printhead is configured to print with a plurality of different inks.

6. The method according to claim 1, wherein the printhead is configured to print with a first ink, the system comprising a further printhead configured to print with a second ink.

7. The method according to claim 1, wherein the sequence of predetermined dot patterns is chosen to have varying intervals and positions to reduce structure which may be detected visually by humans.

8. The method according to claim 1, wherein at least one predetermined dot pattern in the sequence of predetermined dot patterns is positioned in a region of the at least one surface which will be printed on when the third swathe data is printed.

9. The method according to claim 1, wherein at least one predetermined dot pattern in the sequence of predetermined dot patterns is positioned in a region of the at least one surface which will not be printed on with the same or similar ink when the third swathe data is printed, wherein the third swathe data is modified to compensate for an existence of the at least one predetermined dot pattern by not printing dots where their actual geometric relationship has been measured.

10. The method according to claim 1, wherein at least one predetermined dot pattern in the sequence of predetermined dot patterns is positioned in a region of the nominal surface which will not be printed on when the third swathe data is printed, wherein the third swathe data is configured to print over the at least one predetermined dot pattern with an ink chosen to conceal the at least one predetermined dot pattern by being similar to the color of the at least one surface which is unprinted.

11. The method according to claim 1, wherein the second swathe data is printed on the at least one surface using an ink which does not leave a permanent visible mark on the at least one surface.

12. The method according to claim 1, wherein determining the actual geometric relationship comprises using a digital camera and an image processing module, wherein the image processing module is configured to analyze the relative positions of printed dots in the printed second swathe data, and to identify groups of dots which comprise the at least one dot pattern.

13. The method according to claim 12, wherein the image processing module is configured to compare the actual geometric relationship with the nominal geometric relationship to determine the at least one difference.

14. A system comprising a printhead configured to print an image on at least one surface, wherein the at least one surface differs in shape from a nominal surface by a known tolerance, and wherein the printhead and the at least one surface move relative to each other along a predetermined print path comprising at least one swathe of image data, the system further comprising a processor configured to:

provide first swathe data for printing the image on the nominal surface; and provide second swathe data for the at least one swathe, wherein the second swathe data defines a sequence of marks to be made by the printhead, which produce a sequence of predetermined dot patterns when printed on the nominal surface, wherein at least one dot pattern from the sequence of dot patterns and an existing feature of the nominal surface have a nominal geometric relationship;

wherein the printhead is further configured to print the second swathe data on the at least one surface;

wherein the processor is further configured to:

determine, for at least one of the least one dot pattern, the actual geometric relationship of the at least one dot pattern printed on the at least one surface and an existing feature of the at least one surface corresponding to the existing feature of the nominal surface;

compare the actual geometric relationship with the nominal geometric relationship to determine at least one difference; and provide third swathe data by applying an adjustment to the first swathe data to compensate for the at least one difference.

15. The system according to claim 14, further comprising a digital camera and an image processing module configured to determine the actual geometric relationship.

16. A printing system comprising a system according to claim 14.

* * * * *